United States Patent [19]

Parietti

[11] Patent Number: 4,841,941

[45] Date of Patent: Jun. 27, 1989

[54] PRESSURE REDUCER FOR LIQUID AND COMPRESSED GASES

[75] Inventor: Pietro Parietti, Piacenza, Italy

[73] Assignee: Poliauto di Pietro Parietti & C. S.n.c., Piacenza, Italy

[21] Appl. No.: 167,978

[22] Filed: Mar. 14, 1988

[30] Foreign Application Priority Data

Apr. 1, 1987 [IT] Italy ............................. 33511/87[U]

[51] Int. Cl.⁴ ........................................... F02B 43/00
[52] U.S. Cl. .................................. 123/527; 123/525; 48/189.1
[58] Field of Search ............... 123/527, 590; 48/189.1, 48/180.1

[56] References Cited

U.S. PATENT DOCUMENTS

| | | | |
|---|---|---|---|
| 3,960,126 | 11/1976 | Shinoda | 123/527 |
| 4,413,607 | 11/1983 | Batchelor et al. | 123/527 |
| 4,483,302 | 11/1984 | Mannessen | 123/527 |
| 4,632,083 | 12/1986 | Reggiani | 123/577 |

Primary Examiner—E. Rollins Cross
Attorney, Agent, or Firm—Notaro & Michalos

[57] ABSTRACT

A pressure reducer designed to feed gas-driven vehicles, of the type comprising an inlet valve, an outlet valve, and a gas by-pass valve, wherein the valvular closing elements are fitted with systems designed to connect areas situated on opposite sides of the valvular closing elements in order to cancel out the force components due to the gas pressure, and systems designed to regulate the opening of the valvular elements according to the pressure detected at the outlet.

6 Claims, 2 Drawing Sheets

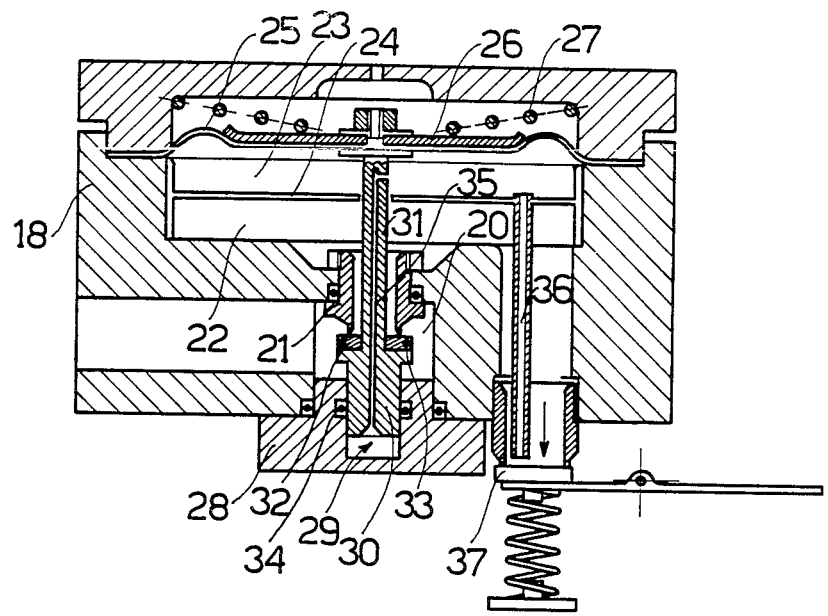
FIG 3
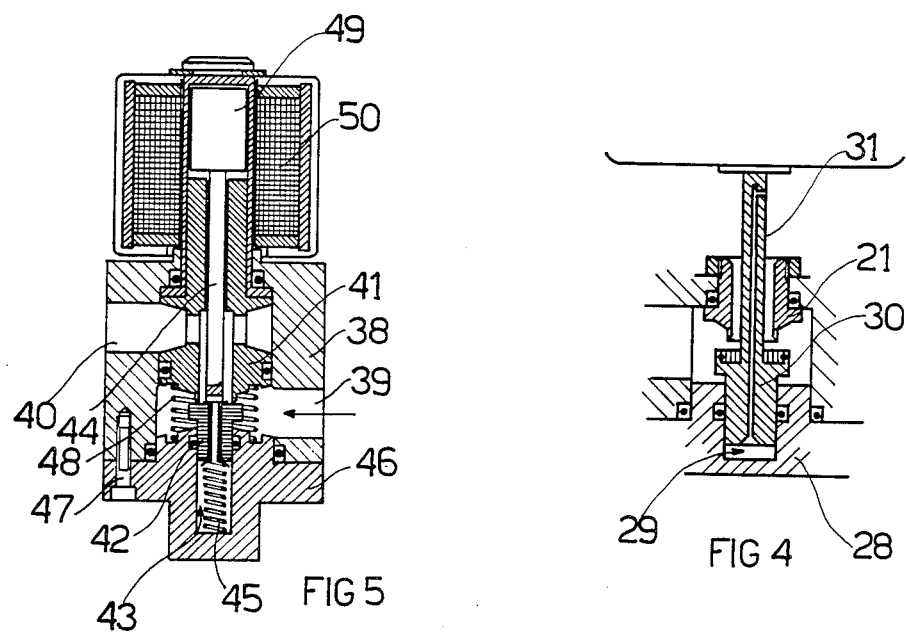
FIG 5
FIG 4

PRESSURE REDUCER FOR LIQUID AND COMPRESSED GASES

This invention relates to a pressure reducer designed to feed gases, especially compressed gases, to internal combustion engines.

FIELD AND BACKGROUND OF THE INVENTION

The pressure reducer of the invention is the type comprising an inlet valve, an outlet valve and a gas by-pass valve, and is characterised by the special arrangement and conformation of the parts, which makes it safer to use than similar known types. In addition, it guarantees constant outflow pressure regardless of the gas pressure fed into the reducer, this being essential to allow precise carburetion regulation under any operating conditions.

In order to feed liquid or compressed gases to internal combustion engines, a device must be installed prior to the engine feed apparatus which reduces the pressure of the gas arriving from the tank (which in the case of compressed gases can reach values of over 200 atmospheres) to a value generally lower than one atmosphere. To ensure proper operation of the engine under any conditions, the pressure at the reducer outlet should be kept as constant as possible.

This problem has not yet been fully solved with known pressure reducers, especially in the case of compressed gas feed, where the pressure varies within an extremely wide range.

FIG. 1 shows a diagram of the conventional type of pressure reducer, in which high-pressure gas enters through a pipe 1, closed by a valve 2, and exits through a pipe 3.

A flexible diaphragm 4 is fitted inside the reducer; a cap 5 is fixed to the diaphragm, and a helical spring 6 acts on the cap, tending to push the diaphragm downwards.

A pin 7 is fixed to the diaphragm; this pin operates on the end of a lever 8 with central fulcrum 9. Valve 2 is fitted at the opposite end of the said lever.

The force F exerted by spring 6 tends to keep valve 2 open, allowing gas to pass through it.

As the pressure in the reducer increases, it pushes diaphragm 4 upwards against spring 6, closing valve 2.

The operation of the reducer is governed by the following equation:

$$(P \times s \times a) + (F \times b) = (p \times S),$$

where:
S = area of diaphragm
p = pressure inside reducer
s = area of pipe 1
P = pressure of gas entering reducer
F = force exerted by spring 6
a,b = arms of lever 8, as shown in the diagram.

In this equation the only variables are P and p. This means that the pressure inside the reducer, and thus at the reducer outlet, depends on the pressure at the reducer inlet which, as already mentioned, varies considerably depending on the level to which the tank is filled. This makes it impossible to obtain optimum engine feed regulation suitable for any running conditions and any tank level.

Pressure reducers comprise (or are coupled to) a by-pass valve designed to cut off the gas supply. This valve must remain in the closed position when the installation is not in operation.

In known types of solenoid valve (one of which is illustrated in the diagram shown in FIG. 2), high-pressure gas arriving from a pipe 10 flows to a chamber 11, from which it exits through a nozzle 12.

This nozzle is closed by a valve 13 which slides inside a seating 14 (not airtight), surrounded by an electromagnet 15.

A spring 16 tends to press the valve downwards, to keep it closed.

Valve 13 is kept pressed downwards in the closed position by the pressure of the gas flowing from chamber 11 to seating 14.

While this configuration is necessary for safety reasons because the valve must be designed to remain closed when not operating, it involves some drawbacks; in order to open the valve, considerable force needs to be exerted to overcome the gas pressure on valve 13 which, as mentioned, often exceeds 200 atmospheres.

This means fitting a sufficiently powerful electromagnet which will therefore be large, costly and present high current absorption.

To overcome this difficulty, manufacturers often fit this solenoid valve after the pressure reducer, where the gas pressure is generally under 0.5 atmospheres. This system allows valve control with minimal energy absorption, although it presents the drawback that high gas pressure still remains in some parts of the reducer, located prior to the valve, even when the installation is not in operation.

U.S. Pat. No. 3,960,126 illustrates a liquid gas pressure regulator divided internally into three chambers by a pair of diaphragms.

The diaphragms are connected by a spring fitted between them.

The first chamber contains a valve opened by the first membrane to regulate the incoming gas.

The second diaphragm is sensitive to the negative pressure created in the third chamber, connected to the carburettor. Variations in the position of the second diaphragm affect the first, to which it is connected via the spring, thereby controlling the operation of the valve located in the first chamber so as to adapt the gas pressure in the reducer to the engine rotation speed.

This type of pressure reducer still does not solve the problems referred to above; equally, its construction is extremely complex, and it is therefore subject to breakdowns.

SUMMARY OF THE INVENTION

A reducer is therefore required which produces a constant pressure value at the outlet, regardless of variations in feed pressure, at any engine rotation speed.

Equally, incoming gas by-pass equipment is needed which requires minimal power to be activated.

For this purpose, this invention comprises a pressure reducer with a gas by-pass solenoid valve at the inlet. The reducer contains systems designed to distribute the pressure on opposite, equal-sized surfaces of the valve parts or gas by-passes. The regulated pressure in the reducer is independent of the external feed pressure and the flow rate of the gas delivered by the pressure reducer.

This invention will now be described in detail, by reference to the annexed figures.

BRIEF DESCRIPTION OF THE DRAWINGS

In the drawings:

FIG. 3 is a cross-section of a pressure reducer in accordance with the invention;

FIG. 4 is a cross-section of a detail of the reducer shown in FIG. 3, with the valve in the open position; and FIG. 5 is a cross-section of the gas by-pass solenoid valve of a reducer in accordance with the invention.

DETAILED DESCRIPTION

Figure 1:
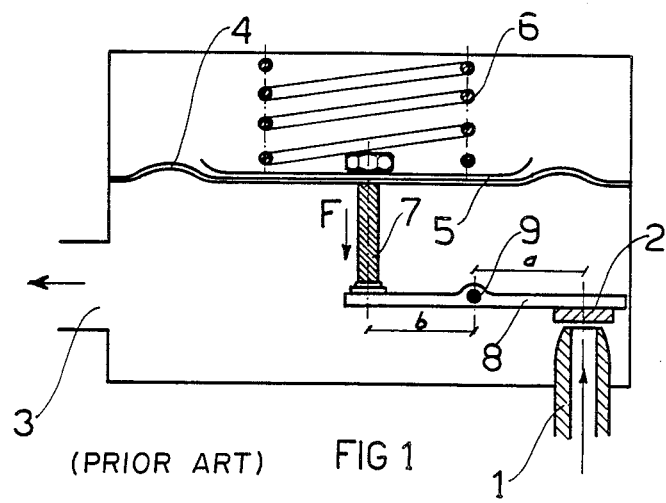
FIG. 1 is a cross section of one type of conventional pressure reducer.
Figure 2:
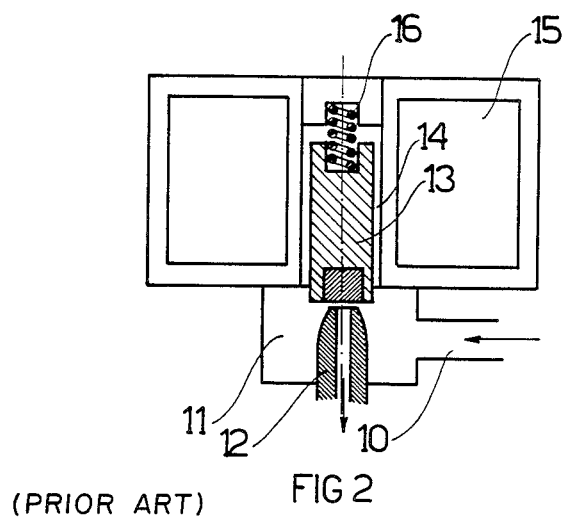
FIG. 2 is a cross section of another type of conventional pressure reducer.

The pressure reducer in accordance with the invention comprises a casing 18 with a high-pressure gas inlet pipe 19; this pipe leads to a chamber 20 which communicates via a valve 21 with an upper chamber divided into two compartments, 22 and 23, by a wall 24. Upper chamber 23 contains a diaphragm 25 with a cap 26, with a spring 27 which tends to press the cap downwards.

The bottom of chamber 20 is closed by a part 28 which contains a cylindrical chamber 29 with O-ring 34, in which a piston 30 runs.

Shaft 31 of piston 30 passes through valve 21, and is fixed at the top to diaphragm 25 and cap 26.

Chamber 29 is connected to upper chamber 23 via a pipe 35 which runs through shaft 31 axially, while a second pipe 36 connects chamber 23 to the area in the immediate vicinity of the gas outlet, where a valve 37 is fitted.

Piston 30 can be made of a synthetic material such as nylon or to Teflon (a trademark), or of metal, as required. In the latter case a suitable gasket must be fitted at the top of the piston to improve the seal.

In the case illustrated, the upper part of piston 30 is enlarged, and a ring gasket 32 is inserted, (made, for example, of Teflon) with a perimeter O-ring 33. A second O-ring is placed in a ring-shaped seating around piston 30.

O-ring 33 is needed to prevent gas from leaking under gasket 32 due to the very high pressure, and causing the gasket to slip out of its seating.

The same result can be achieved by drilling a hole to connect the seating of ring gasket 32 with pipe 35, in order to release the pressure.

The upper and lower surfaces of the part of piston 30 exposed to the high-pressure gas are equal, which means that the resultant of the forces exerted by the pressure is nil. The ring-shaped surface of piston 30 between shaft 31 and the walls of valve 21 is also equal (less the part corresponding to shaft 31) to the lower surface of the piston, which constitutes the upper wall of chamber 29.

The resultant of the thrusts exerted on the piston by low-pressure gas is therefore almost nil, and the piston can be considered subject only to the force exerted by spring 27 and the pressure exerted by the gas on diaphragm 25.

The system operates as follows:

Under static conditions, with valves 21 and 37 closed, the pressure is equal in all parts of chambers 22, 23 and 29. The thrusts on the opposite surfaces of piston 30 are almost nil, and in this case the pressure in chamber 23 overcomes the force exerted by spring 27 and pushes diaphragm 25 upwards, thereby keeping piston gasket 32 in contact with valve 21.

As soon as outlet valve 37 opens to feed the engine, the pressure in the reducer falls, the force exerted on diaphragm 25 is reduced, and piston 30 is pushed downwards by spring 27, retracting slightly from valve 21.

The gas then flows from pipe 19 and chamber 20 into the valve, where the pressure approaches the desired value (approx. 0.5 atm), due to the considerable pressure drop at the constriction between valve 21 and piston gasket 32.

The gas then flows from chamber 22 towards the exit, where the pressure reaches the required value, lower than the previous value, as a result of the successive pressure drops along its route.

Pipe 36 connects chamber 23 with the gas outlet area, producing the same pressure value in both places, while the force exerted by this pressure on the diaphragm balances out that exerted by spring 27, keeping the valve in the open position to produce constant pressure at a pre-set value at the outlet.

The presence of wall 24 separating chambers 22 and 23 is essential to produce a higher gas outflow. If wall 24 were missing, diaphragm 25 would not be subjected to a pressure equal to that found near the outlet, but to a higher pressure, equal to that at valve 21, without the subsequent pressure drops.

This higher pressure would cause the diaphragm to change position, thus altering the opening conditions of valve 21, and this would produce a different state of balance, with a reduction in gas outflow.

By separating chambers 22 and 23 with wall 24, the position of diaphragm 25 can be made to depend on the gas outlet pressure alone.

If the diameter and position of pipe 36 are suitably correlated, a pressure equal to that present under static conditions can also be obtained under dynamic conditions.

A high-pressure gas by-pass valve is fitted at the pressure reducer inlet; this valve is illustrated separately in the drawing in FIG. 5 for ease of representation.

The solenoid valve comprises a casing 38 with an inlet pipe 39 and an outlet pipe 40. A valve 41, closed by a piston 42, is inserted in the solenoid valve. Piston 42 runs in a seating 43, and is pushed downwards by a shaft 44, against the force exerted by a spring 45.

Seating or chamber 43 is cut into lower solenoid valve cover 46, which is secured to casing 38 with screws 47 or the like. A spring 48 presses on valve 41, keeping it in position, especially during assembly and in the absence of gas pressure.

Shaft 44 passes through valve 41, terminating at the top in a ferromagnetic head 49, subject to the action of an electromagnet 50.

Piston 42 is crossed by a passage which connects lower chamber 43 with the inside of valve 41. Here again, suitable seals are fitted on valve 41 and at piston 42.

The various parts are designed so that the upper and lower surfaces of the part of piston 42 which comes into contact with the high-pressure gas are equal.

The piston support surface of valve 41 is also equal to the surface of the opposite wall, inside seating 43, and the resultant of the forces exerted by the pressure on the piston is therefore nil.

Piston 42 is therefore subject only to the force of spring 45, which tends to keep it pressed against valve 41 to close it, and to the force of electromagent 50, which tends to lower it, only overcoming the force exerted by the spring in addition to friction.

Due to the arrangement of the parts as described the solenoid valve is small and inexpensive, yet capable of diverting high-pressure, high flow rate gases.

The sizes and materials used can obviously be altered, depending on actual requirements.

I claim:

1. A pressure reducer for feeding gas-driven vehicles, comprising an inlet having an inlet valve with a first valvular closing element, an outlet having an outlet valve with a second valvular closing element, a gas bypass valve connected to said inlet, first means for connecting areas situated on opposite sides of said first valvular closing element in order to cancel out force components on said first valvular closing element due to gas pressure, and second means for regulating opening of said first valvular closing element according to a gas pressure at said outlet.

2. Pressure reducer for compressed gases comprising, a casing having an interior, a diaphragm connected to said casing for movement in the interior, an inlet valve in the interior, a piston moveable in the interior against said inlet valve for closing said inlet valve, said piston being connected to said diaphragm, a spring acting on one side of said diaphragm, the outer side of said diaphragm being acted upon by gas pressure in the interior, and a cylinder defined in the interior of said casing for slidably receiving said piston, said piston, including a passage therein, communicating said cylinder with the interior on said other side of said diaphragm, for equalizing forces due to gas pressure on said piston, said casing including a gas outlet communicating with the interior on said other side of said diaphragm.

3. Pressure reducer as per claim 2, including a gas bypass valve having an inlet pipe and an outlet pipe, said gas bypass valve having a second piston for closing passage between said inlet pipe and outlet pipe, electromagnet means connected to said second piston for moving said second piston, flexible means engaged with said piston for resisting movement of said piston due to action of said electromagnetic means, and a second cylinder in which said second piston rides, said second piston including a pipe for connecting said outlet pipe of said bypass valve with said second cylinder for cancelling force components on said second piston due to gas pressure.

4. Pressure reducer as per claim 2, characterised by the fact that the interior is divided by a wall into two chambers, one of which is in contact with the inlet valve, and the other communicating with the gas outlet, and that it is fitted with a pipe designed to connect the chamber in contact with the diaphragm with an area located close to the gas outlet.

5. Pressure reducer as per claim 3, characterised by the fact that the said by-pass valve is located at the gas inlet.

6. Pressure reducer as per claim 2, characterised by the fact that a seating of O-ring is cut into the cylinder wall between piston and cylinder.

* * * * *